(12) United States Patent
Di Mauro et al.

(10) Patent No.: US 9,237,827 B2
(45) Date of Patent: Jan. 19, 2016

(54) COOKING APPLIANCE OF THE GRILL OR BARBECUE TYPE

(75) Inventors: David Di Mauro, Gundolsheim (FR); Marc Parmentier, Labaroche (FR)

(73) Assignee: AGAPEA SOLUTIONS, Gundolsheim (FR)

( * ) Notice: Subject to any disclaimer, the term of this patent is extended or adjusted under 35 U.S.C. 154(b) by 253 days.

(21) Appl. No.: 13/992,758

(22) PCT Filed: Dec. 8, 2011

(86) PCT No.: PCT/IB2011/002970
§ 371 (c)(1),
(2), (4) Date: Aug. 26, 2013

(87) PCT Pub. No.: WO2012/076968
PCT Pub. Date: Jun. 14, 2012

(65) Prior Publication Data
US 2014/0000463 A1 Jan. 2, 2014

(30) Foreign Application Priority Data
Dec. 9, 2010 (FR) ...................... 10 60302

(51) Int. Cl.
| A47J 27/00 | (2006.01) |
| A47J 37/08 | (2006.01) |
| A47J 37/06 | (2006.01) |
| A47J 37/07 | (2006.01) |
| H05B 6/12  | (2006.01) |

(52) U.S. Cl.
CPC .............. A47J 37/07 (2013.01); A47J 37/0731 (2013.01); H05B 6/1209 (2013.01)

(58) Field of Classification Search
CPC ..... A47J 37/07; A47J 37/0731; H05B 6/1209
USPC ................... 99/385, 390, 391, 393, 395–398, 99/400–402, 426, 427, 445–449; 219/622; 126/25 A, 25 R, 30
See application file for complete search history.

(56) References Cited

U.S. PATENT DOCUMENTS

| 3,195,442 A      | 7/1965  | Russell |
| 3,389,651 A      | 6/1968  | Schultz |
| 2003/0140798 A1  | 7/2003  | Rummel et al. |
| 2009/0272278 A1* | 11/2009 | von Herrmann et al. ....... 99/450 |

FOREIGN PATENT DOCUMENTS

| DE | 9112110 U1  | 1/1992 |
| FR | 2527919 A1  | 6/1982 |
| FR | 2851445 A1  | 2/2003 |

OTHER PUBLICATIONS

PCT/IB2011/002970 International Search Report, Mar. 13, 2012, European Patent Office, P. B. 5818 Patentlaan 2, NL—2280 HV Rijswijk.

* cited by examiner

Primary Examiner — Dana Ross
Assistant Examiner — Lindsey C. Teaters
(74) Attorney, Agent, or Firm — The Jansson Firm; Pehr B. Jansson

(57) ABSTRACT

A cooking appliance (1) of the grill or barbecue type, comprises a frame (10) supporting a cooking surface (2) on which foodstuffs to be cooked can be arranged, and a heating surface (3) arranged opposite said cooking surface (2). The frame (10) defines a housing (4) parallel to a horizontal plane (P) and designed to accommodate the cooking surface (2) between a storage position in which it lies on the bottom of the housing (4) and a use position in which it is inclined at an angle α to said horizontal plane (P). The heating surface (3) is connected to the frame (10) by a hinge (5) allowing the displacement of the heating surface (3) between a passive position in which it closes the housing (4) and an active position in which it is inclined at an angle β to the horizontal plane (P), the housing (4) is open and the cooking surface (2) can be deployed and positioned opposite the heating surface (3). The cooking surface (2) is arranged between the horizontal plane (P) and the heating surface (3) so that the substances released by the foodstuffs while they cook do not run onto the heating surface (3).

15 Claims, 7 Drawing Sheets

COOKING APPLIANCE OF THE GRILL OR BARBECUE TYPE

TECHNICAL FIELD

This invention relates to a cooking appliance of the grill or barbecue type, comprising a frame supporting a cooking surface on which foodstuffs to be cooked can be arranged, and a heating surface arranged opposite said cooking surface, said frame comprising first means designed to allow inclination of said cooking surface with respect to a horizontal plane P at an angle $\alpha$ less than 90°, and second means designed to allow inclination of said heating surface with respect to said horizontal plane P at an angle $\beta$ less than 90°, said cooking surface being arranged between said horizontal plane P and said heating surface so that the substances released by the foodstuffs while they cook do not run onto said heating surface.

BACKGROUND

Numerous cooking appliances of the barbecue or grill type currently exist on the market, intended for the general public or reserved for professional use, the various models differing from each other mainly by the source of heat used to cook the foodstuffs.

Thus, while some grill the foodstuffs using embers or smoke obtained by burning wood or charcoal, others are based on the use of an electric element or a gas burner.

Irrespective of the heat source used, most traditional barbecues are designed so that the cooking surface on which the foodstuffs are arranged, generally a grill, plate or skewer, and the heating surface containing the embers, the electrical element or the gas burner, are located opposite each other in superimposed planes, said cooking surface being above said heating surface.

Thus, publication U.S. Pat. No. 3,389,651, for example, describes a grill burning charcoal, comprising a cooking surface and a heating surface inclined at 45° to the ground, and in which the cooking surface extends above the heating surface. With this type of configuration in which the cooking surface is above the heating surface, at least some of the cooking juices and fats running from the foodstuffs while they cook inevitably fall onto the heat source located below, and are immediately carbonized, generating toxic smoke containing compounds recognized as being highly carcinogenic. These compounds may in particular prove especially dangerous when using this type of cooking appliance in a closed environment, such as an apartment. Furthermore, the cooking appliance described in publication U.S. Pat. No. 3,389,651 may prove dangerous and in particular start a fire due to the type of fuel used or cause burns since no heat protection is planned for the user. Consequently, the user must remain permanently vigilant with this type of cooking appliance. In addition, the efficiency of this type of appliance is limited due to the fact that the foodstuffs are cooked by radiation through perforated sheets, and not directly.

Other solutions are also known, developed to avoid any contact between the substances running from the foodstuffs and said heating surface, to limit the emission of toxic and unpleasant smoke.

One of these, well known by those skilled in the art and described in particular in document FR 2 851 445, is based on the implementation of vertical cooking using cooking and heating surfaces placed opposite each other in vertical planes.

Nevertheless, while it reduces the quantity of toxic smoke caused by carbonization of the fats, this solution is not always entirely satisfactory.

Indeed, it has been observed that the fats running from the foodstuffs placed in the upper part of the cooking surface drip along the foodstuffs placed at lower levels, sometimes causing them to catch fire. In addition, although to a lesser extent, the fats always splash onto the heating surface, producing smells and other unpleasant fumes. Consequently therefore, this type of cooking appliance is not suitable for healthy cooking in an indoor environment.

Another alternative, known from document FR 2 527 919, is defined by an electric barbecue in which said cooking and heating surfaces are also arranged opposite each other in horizontal planes but where, however, said heating surface is located above said cooking surface. Once again, the problem of toxic smoke is not fully resolved, since the fats always splash onto the electrical element where they are carbonized, emitting smoke and unpleasant smells.

Another solution, described in publication DE 91 12 110 concerns a barbecue fueled with charcoal. It comprises an ember tray whose front side, equipped with slots, defines a heating surface inclined at a closed angle with respect to the horizontal. The ember tray is supported by a frame comprising means for receiving a cooking grill intended to be placed opposite the front side of the ember tray in an inclined plane parallel to that of said front side. The ember tray is free to move horizontally with respect to the cooking grill, either towards it or away from it to regulate the cooking power. The barbecue also comprises a surface to catch the fats running from the foodstuffs while they cook. Although it limits the emission of toxic and unpleasant smoke, this type of barbecue nevertheless exhibits several drawbacks such as pollution of the foodstuffs by the combustion products, i.e. the embers and the ashes. Indeed, it does not remove the risks of burns for the user or the risks of fire due to the use of embers, which also limits its implementation to an outdoor environment and prevents any use in apartment. In addition, it is very bulky which means that a large storage area is required and it is difficult to transport.

Furthermore, like the devices mentioned above, the traditional cooking appliances of grill or barbecue type are not satisfactory as regards the heat sources commonly implemented.

Wood, in fact, not only has a certain degree of inertia but may also be dangerous. In addition, numerous traditional cooking appliances of grill or barbecue type operate in an "all or nothing" mode and allow no adjustment of the cooking temperature. Consequently, the foodstuffs must be monitored constantly during cooking then moved away from the heating surface as soon as the desired degree of cooking has been obtained, offering little flexibility and little possibility of keeping the foodstuffs hot after cooking.

SUMMARY OF THE DISCLOSURE

This invention seeks to overcome these drawbacks by proposing a barbecue type cooking appliance that can be used to carry out healthy cooking, grill foodstuffs without generating unpleasant carcinogenic smoke, while combining cooking efficiency and flexibility. Another objective of the invention is to propose a cooking appliance of simple design, using few parts, which is both light and compact, and which takes up little space, both when in and out of use. Another objective of the invention is to propose a cooking appliance which is easy to clean, designed so that the cooking surface can be handled without the need for heat protection, and consequently allowing cooking in complete safety by eliminating any risk of burns.

This invention therefore relates to a cooking appliance of the type indicated in the preamble, wherein said frame defines a housing parallel to said horizontal plane P and designed to accommodate said cooking surface between a storage position in which it lies on the bottom of the housing and a use position in which it is inclined at said angle α to said horizontal plane P, and in that said second means comprise a hinge connecting said heating surface to said frame and allowing the displacement of said heating surface between a passive position in which it closes said housing and an active position in which it is inclined at said angle β to said horizontal plane P, said housing is open and said cooking surface can be deployed and positioned opposite said heating surface.

According to an alternative embodiment, said first means may comprise at least one notch formed in said frame and designed to accommodate at least a portion of an edge of said cooking surface, the axis of said notch being inclined at said angle α to said horizontal plane P.

According to another characteristic, said rack may comprise a plurality of notches whose axes are inclined at said angle α to said horizontal plane planned on a rack fastened to the frame and allowing adjustment of the distance between said cooking surface and said heating surface in its use position.

This invention further provides that said housing may comprise a removable bottom to catch the substances released from the foodstuffs while they cook. In this case, said bottom and said housing can be assembled using a drawer link.

Said second means arranged to allow an inclination at an angle β less than 90° of said heating surface to said horizontal plane may further comprise means for locking in position, such as for example a ball pusher.

According to an additional characteristic of this invention, said cooking surface may be removable and reversible so that each side can be directed successively towards the heating surface.

According to an alternative embodiment, said cooking surface may comprise a grill formed by self-tightening sides defining between them at least one space where the foodstuffs to be cooked can be placed. This space may comprise compartments of various sizes in order to accommodate different types of foodstuff.

According to another alternative embodiment, said heating surface may comprise at least one infrared radiation tube connected to a power source selected from gas, electricity or a flammable fluid.

Furthermore, said infrared radiation tube may be arranged between a metal side designed to reflect the heat that it diffuses towards the cooking surface and a glazed side arranged opposite the cooking surface, permeable to infrared radiation and designed to protect the tube from any accidental mechanical contact with the foodstuffs or possible splashes of substances released from the foodstuffs while they cook.

According to an additional characteristic, said infrared radiation tube may be connected to means for regulating its power in order to adjust the heat diffused to said foodstuffs.

According to an additional embodiment, said heating surface may comprise on one of its sides at least one first heat generator defined by an infrared radiation tube and on the other side thereof at least one second heat generator different from said first heat generator to create two different types of cooking. In this case, said second heat generator may comprise at least one induction coil.

Furthermore, the cooking appliance may also comprise safety means designed to prevent its operation when either said cooking surface or said heating surface is not positioned in said inclination at said angle α or said angle β. According to an alternative embodiment, said safety means may comprise a connector arranged on the side of said heating surface such that said connector is only accessible when said heating surface is in the active position.

According to another alternative embodiment, the cooking appliance may be further characterized in that said frame comprises means designed to allow its building in a work top.

BRIEF DESCRIPTION OF THE DRAWING

This invention and its advantages will become more apparent on reading the following description of several embodiments given as non-limiting examples, and referring to the attached drawings in which.

DETAILED DESCRIPTION

With reference to the Figures, the invention concerns a cooking appliance 1, 1a used to grill foodstuffs placed on a cooking surface, such as a metal cooking grill 2, using a heating surface 3 arranged opposite said grill 2.

Figure 4:
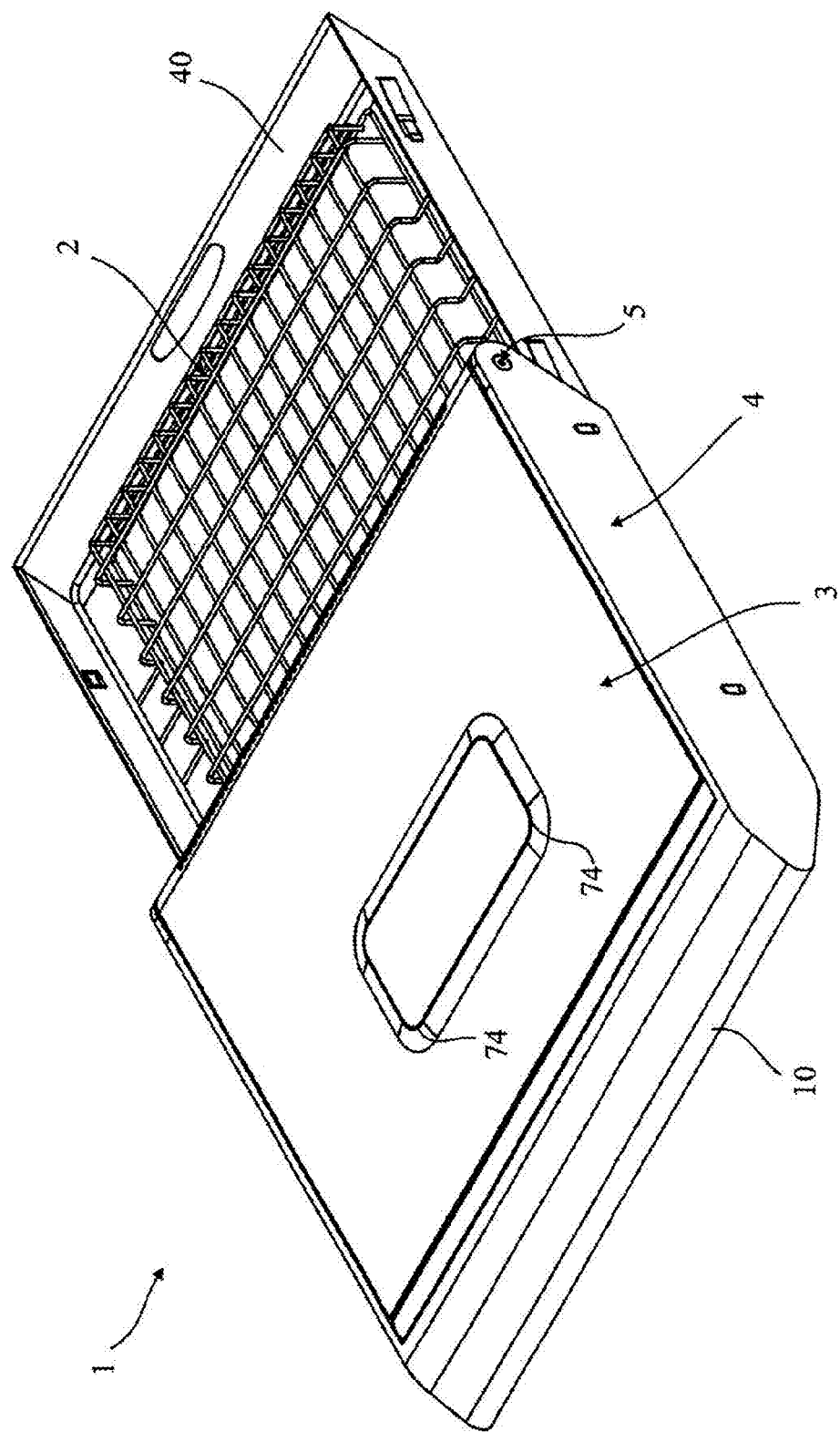
FIG. 4 is a perspective view of the cooking appliance shown on FIG. 1, in which the heating surface is folded in its passive position and the bottom of the housing is being extracted.
Figure 7:
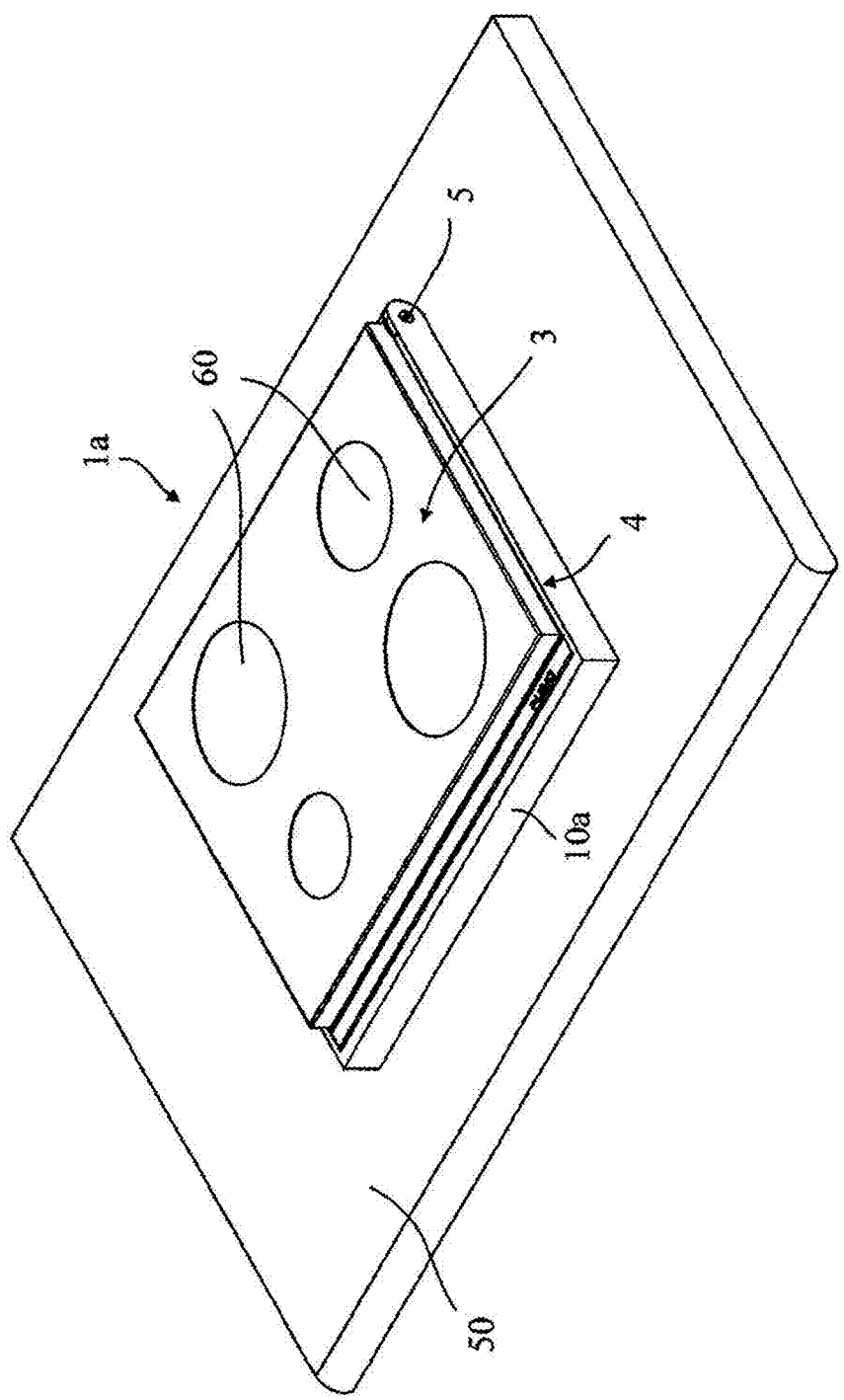
FIG. 7 is a perspective view of the cooking appliance shown on FIG. 6, in closed storage position and exhibiting an additional heating surface.

In the embodiments illustrated on the various figures, the cooking appliance 1, 1a comprises a housing 4 defined by a frame 10, 10a of substantially parallelepipedic shape connected to the heating surface 3 by a hinge 5. The heating surface 3 is connected to a cover 30 and can therefore be displaced between a passive folded position in which the housing 4 is closed (see FIGS. 4, 5 and 7) and an active position in which the housing 4 is open and said heating surface 3 is inclined at an angle β, less than 90°, and for example between 45° and 85°, and for example equal to 70°, to the horizontal plane P formed by the bottom 40 of the housing 4. The hinge 5 is preferably also coupled to means for locking in position, such as for example a ball pusher (not shown) keeping the heating surface 3 in its active inclined position. This ball pusher can define a plurality of inclined positions using successive notches, which may be the same distance apart or not, into which the locking ball is pressed by a return spring. Obviously, any other means for locking in position would be suitable.

Figure 5:
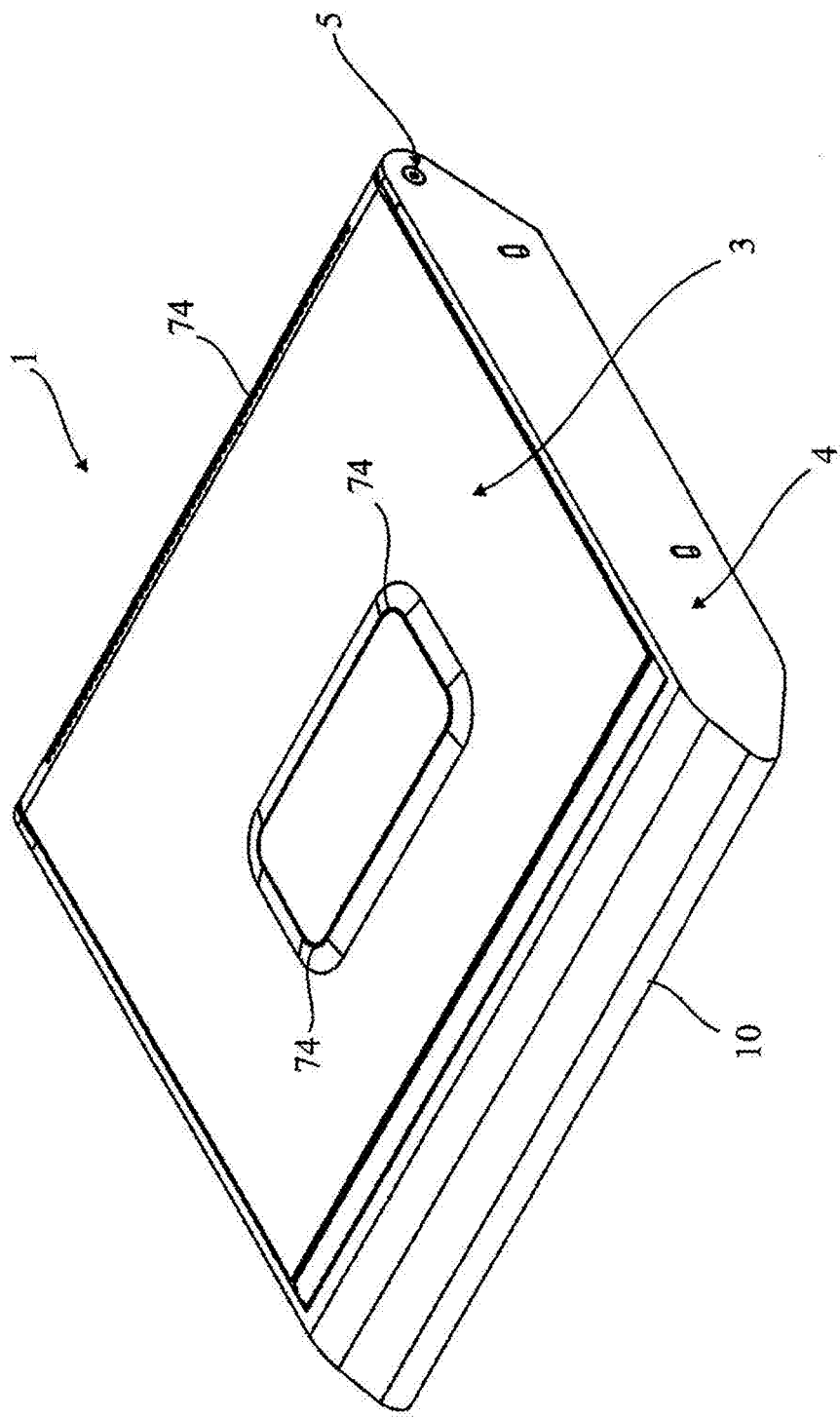
FIG. 5 is a perspective view of the cooking appliance shown on FIG. 1, in closed storage position.

In addition, in the embodiments illustrated, the shape and dimensions of the housing 4 are such that in its closed position, it can contain both the cooking grill 2 and the cable 70 arranged in the housing 4 and the heating surface 3 connected to the cover 30 which closes the frame 10, 10a, resulting in a compact cooking appliance of very small size which can be stored in a reduced space (see FIG. 5). The frame 10, 10a can be carefully designed so as to offer a product which is both functional and aesthetic.

Figure 1:
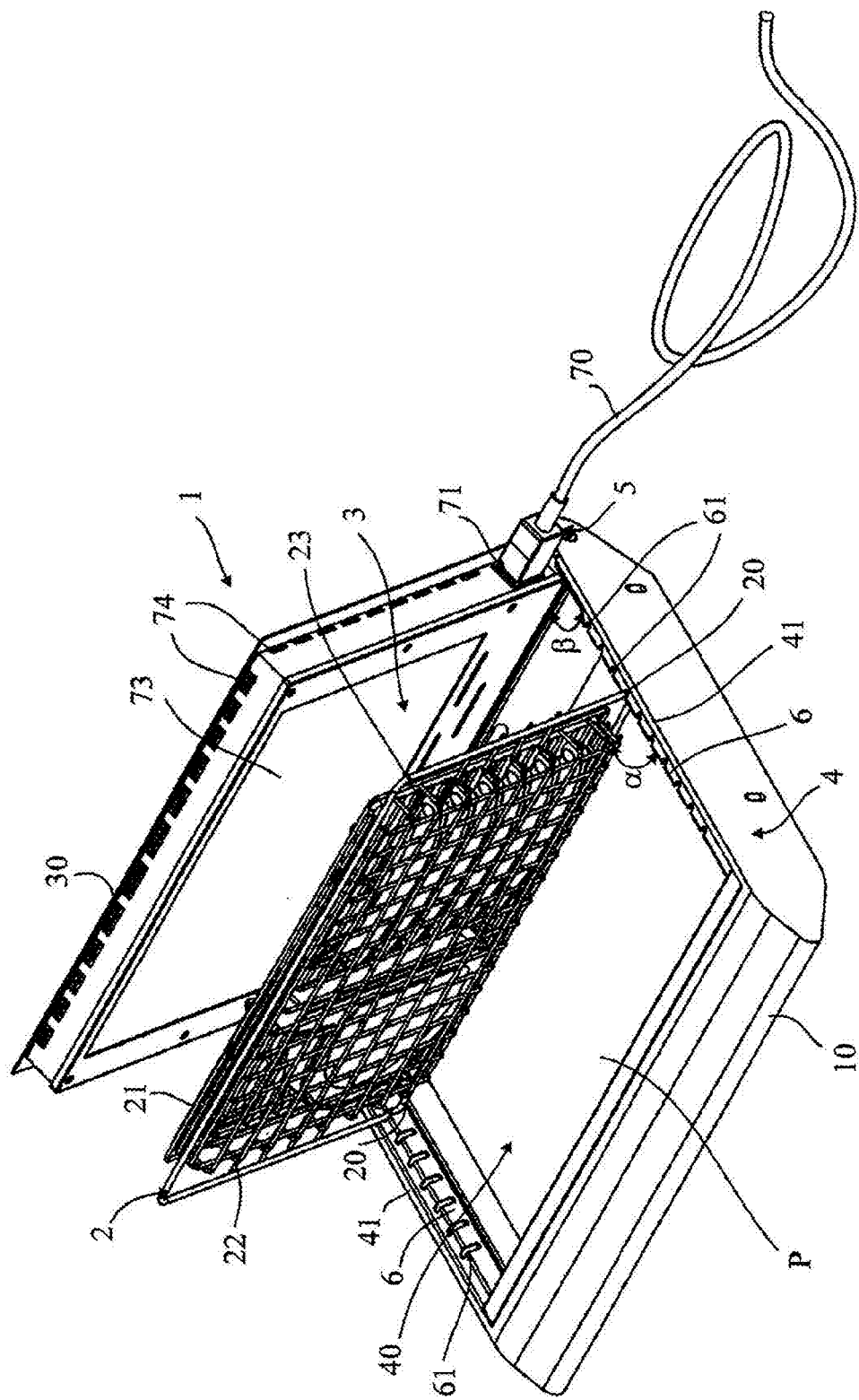
FIG. 1 is a perspective view of a first embodiment of a cooking appliance according to the invention.
Figure 2:
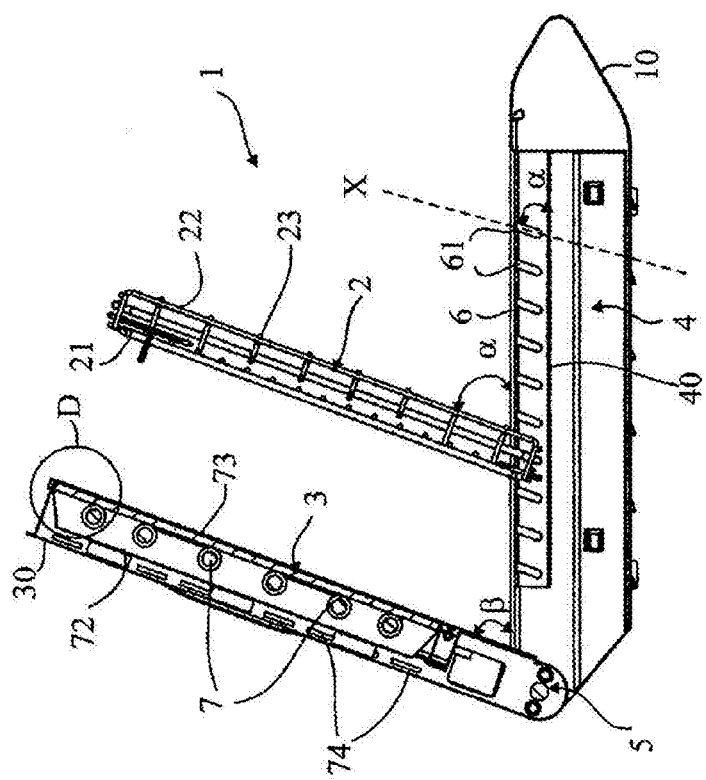
FIG. 2 is a sectional view of the cooking appliance shown on FIG. 1.
Figure 6:
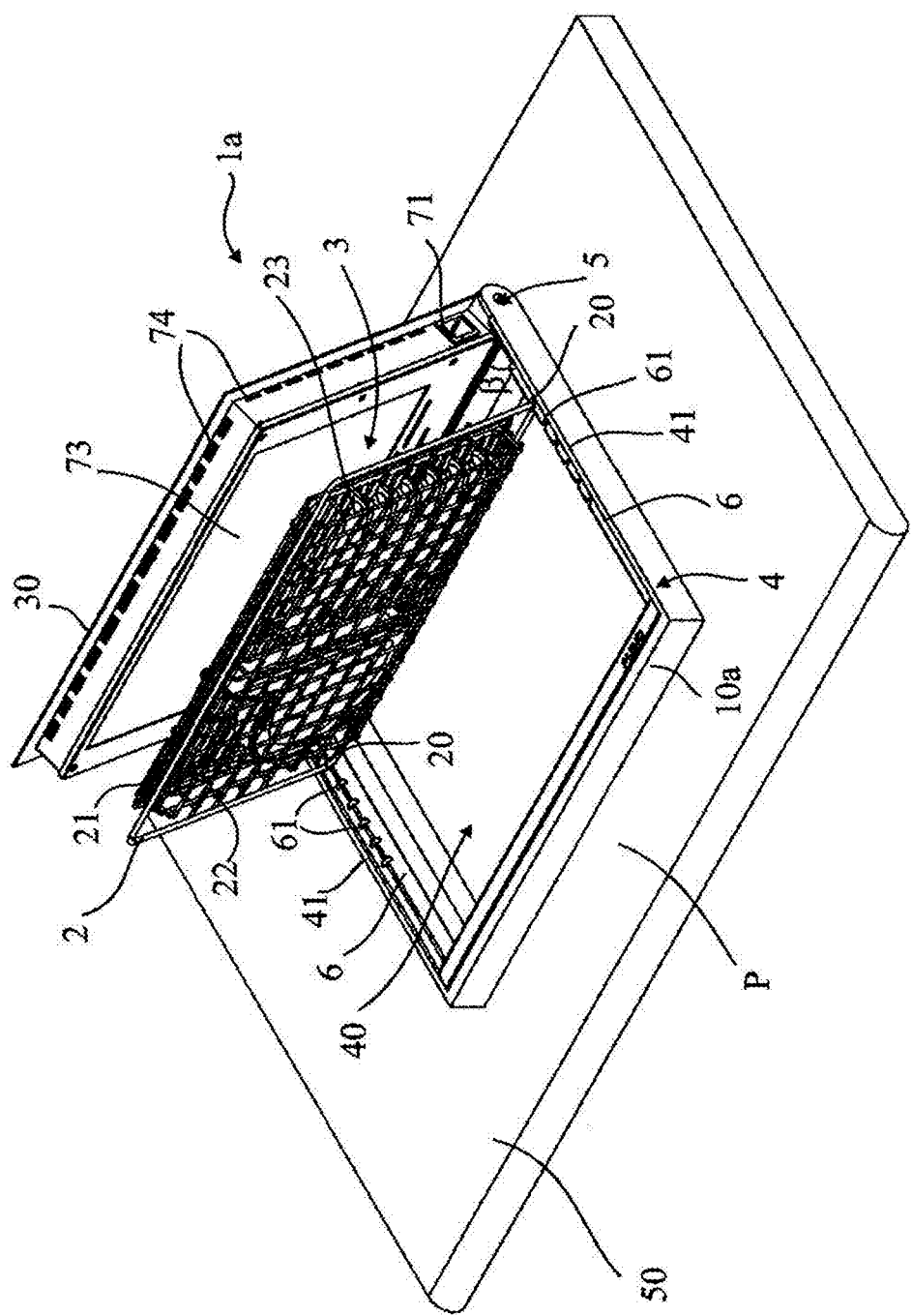
FIG. 6 is a perspective view of a second embodiment of a cooking appliance according to the invention built into a work top and in which the heating surface is folded in its passive position.

As shown on FIGS. 1 and 6, the housing 4 comprises two identical racks 6 equipped with a row of notches 61, produced by machining, stamping or added on each of the internal sides of its lateral edges 41. Each notch 61 of a rack 6 is aligned with a notch 61 of the other rack 6, along a line parallel to the axis of the hinge 5, thereby forming a plurality of pairs of notches 61 placed at increasing distances from the axis of the hinge 5, which may be the same distance apart or not. Still with reference to FIGS. 1 and 6, said pairs of notches 61 are designed to accommodate two consecutive corners 20 of a cooking grill 2, designed to be removable and interchangeable. With reference to FIG. 2, the axis X of each notch 6 is inclined at an angle α less than 90°, and for example between 45° and 85°, and for example approximately 70°, to the horizontal plane formed by the bottom 40 of the housing 4, so that when the grill 2 is engaged in a pair of notches 61, it is itself inclined at said angle α to said horizontal plane P. Angles α and β are equal so that the cooking surface 2 and the grill 2 are parallel. Obviously, these angles do not have to be equal, depending on the cooking result required, due in particular to the fact that the heating surface 3 can be rotated around its hinge 5.

Since the grill 2 is inclined and located below the heating surface 3, i.e. between the heating surface 3 and the bottom 40 of the housing 4, juices, fats and other substances released by the foodstuffs during cooking flow directly towards said bottom 40 which acts as drip tray, thereby avoiding their possible carbonization in contact with the heating surface 3 or their concentration on other foodstuffs located below. Consequently the cooking method is very healthy, with no emission of smoke, and virtually odorless. In addition, in the embodiments illustrated, the bottom 40 is removable and is assembled to said housing 4 preferably by means of a drawer link allowing its extraction for cleaning (see FIG. 4).

Furthermore, the grill 2 can be moved towards or away from the heating surface 3 by its engagement, depending on the case, in a pair of notches 61 at a variable distance from the axis of the hinge 5 connecting said heating surface 3 to said housing 4. The cooking temperature can therefore be regulated independently of the power of the energy source supplying the heating surface 3.

As shown on FIGS. 1 and 6, the cooking grill 2 is preferably formed from self-tightening sides 21, 22, which may be symmetrical or not with respect to the center plane of said cooking grill 2, and which define between them a space where the foodstuffs to be cooked can be placed. Said space can be compartmentalized, for example by means of recesses 23 of different sizes specifically designed to arrange foodstuffs of different thicknesses to prevent them from slipping by gravity towards the bottom 40 of the housing 4 when the cooking grill 2 is in its inclined position. In addition, since said cooking grill 2 is removable and reversible, each of its sides 21, 22 can be directed successively towards the heating surface 3 to allow homogeneous cooking of both sides of the foodstuffs. The cooking grill 2 is made from a material which does not conduct heat or is a poor conductor, such as for example stainless steel, so that it can be handled with bare hands, without heat protection, including when cooking the foodstuffs, for example to turn it over and direct each side of the foodstuffs towards the heating surface 3 and obtain perfectly homogeneous cooking, which is particularly advantageous in terms of personal safety.

According to the invention and as shown on FIG. 2, the heating surface 3 comprises several infrared radiation tubes 7 powered with electricity by means of a detachable cable 70 connected to a power outlet and plugged into a connector 71 located on one side of the heating surface 3. Consequently, access to this connector 71 is possible when the heating surface 3 is in its active inclined position and prevented when the cooking appliance 1, 1a is stored, which represents a safety feature. This type of heating surface equipped with infrared radiation tubes 7 allows a fast temperature rise, for example about 300° C. in less than 10 minutes. When the cooking appliance 1, 1a is not used, the cable 70 may be removed from the connector 71 and stored inside the housing 4. The infrared radiation tubes 7 could also be powered with gas or a flammable fluid, such as for example ethanol. In the latter case, the cooking appliance 1, 1a is completely autonomous in terms of energy. Obviously, any other heat generator can be used, such as electrical elements.

Figure 3:
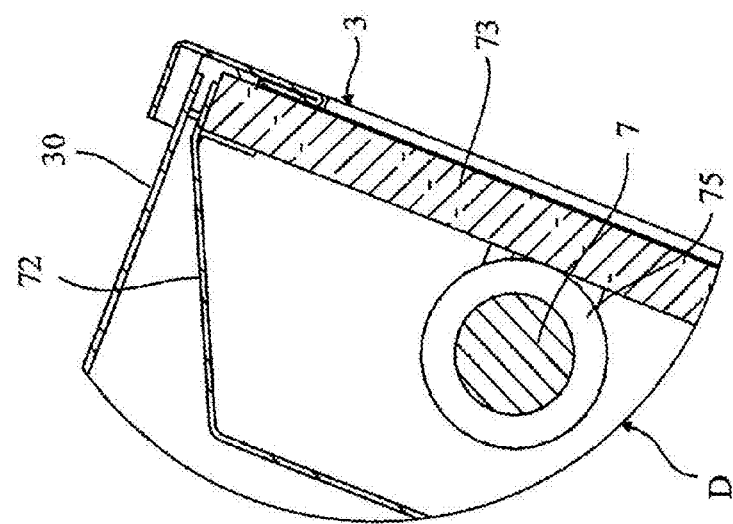
FIG. 3 is an enlarged view of detail D of FIG. 2.

With reference to FIGS. 2 and 3, the infrared radiation tubes 7 are arranged parallel to each other, between a metal side 72, made for example from stainless steel or similar, connected to the cover 30, and a glazed side 73. Each infrared radiation tube 7 is mounted in a connection terminal 75 (see FIG. 3) and can therefore be removed for replacement, if necessary. The connection terminals 75 are located in the side of the cover 30 containing the connector 71 and electrically connected to it in a thermally insulated channel (not shown). The metal side 72 is designed to reflect the heat generated by the infrared radiation tubes 7 towards the cooking grill 2 while the glazed side 73 permeable to the infrared rays and arranged opposite the cooking grill 2, is designed to protect the infrared radiation tubes 7 from any accidental mechanical contact with the foodstuffs or possible splashes of substances released from the foodstuffs while they cook. According to an embodiment, the cover 30 comprises several holes 74 that can be distributed laterally and/or to the bottom and/or to the back of the heating surface 3 (see FIGS. 1, 2, 4) allowing air to flow around the infrared radiation tubes 7 and avoiding an undesirable temperature rise between the glazed side 73 and the metal side 72. Obviously, the tubes shown can be replaced by a single tube configured as a coil to cover the heating surface.

Furthermore, according to an additional characteristic of the invention, the cooking appliance 1, 1a can be equipped with regulation means (not shown) to regulate the power of said infrared radiation tubes 7, in order to adjust the heat diffused towards said foodstuffs. These regulation means may be controlled by a control knob located on said cooking appliance 1, 1a and/or a remote control. The cooking appliance 1, 1a according to the invention may also be equipped with safety means, such as presence detectors or similar, designed to prevent its operation when said cooking grill 2 or said heating surface 3 is not positioned in said inclination at said angle α or at said angle β.

It may also be completed by cooking accessories, such as complementary grills of different shape and dimensions, a spit supported by a structure designed to fit in the notches 61 and connected to a small motor with its own electricity supply, it being also possible to replace the spit by a cooking drum for direct cooking, or cooking in a container, of complete dishes with vegetables in addition to the meat or fish.

It is clear from this description that the invention can achieve the objectives set, i.e. to propose a cooking appliance 1, 1a for healthy grilling of foodstuffs, avoiding any emission of toxic smoke, using a powerful mobile and modular source of heat, this appliance being extremely compact, offering excellent functional safety and preventing any risk of burns.

Figure 8:
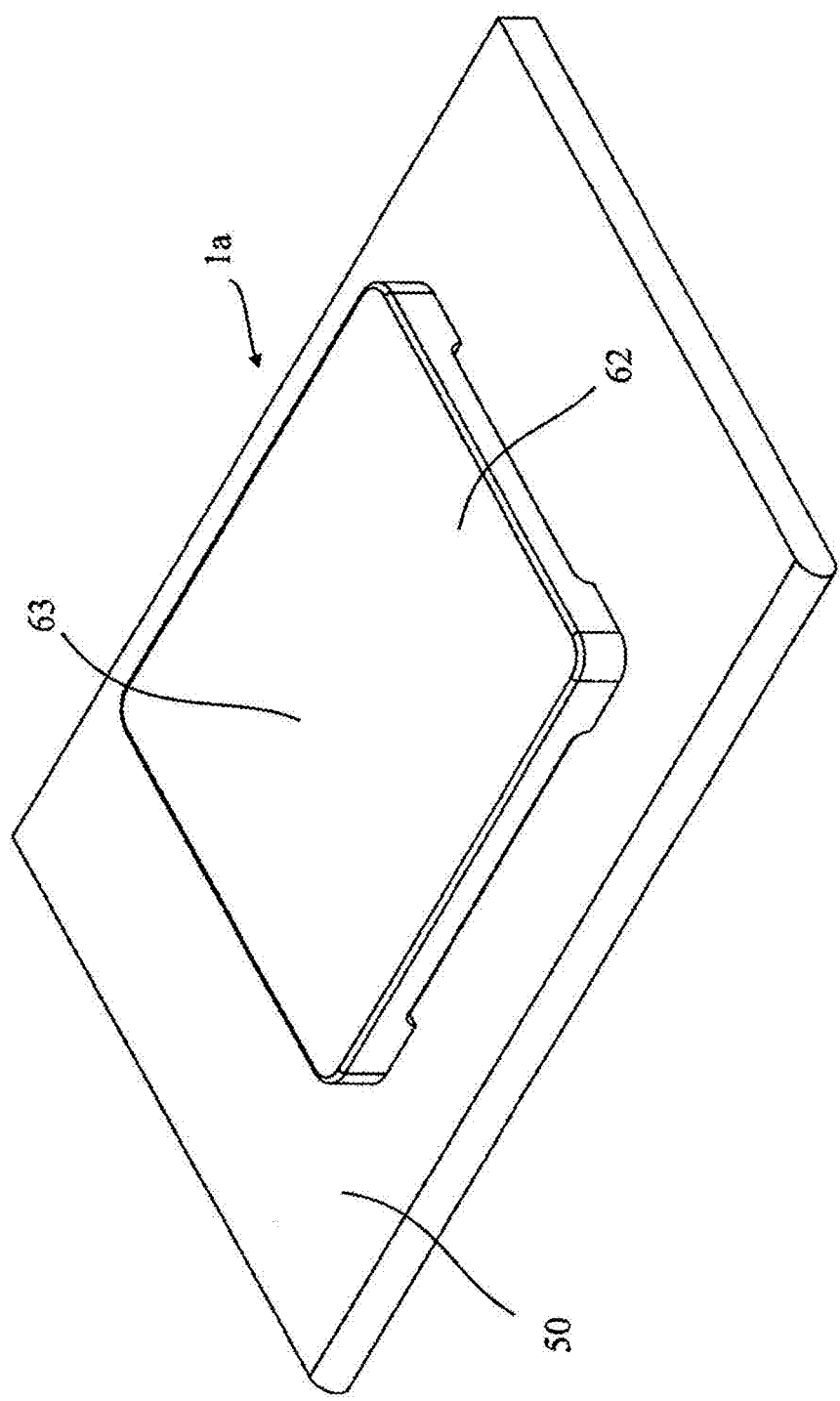
FIG. 8 is a perspective view of the cooking appliance shown on FIG. 6, in closed storage position and covered by a cover forming a work surface.

This type of cooking appliance 1, 1a is therefore perfectly suited for use by the general public, in both indoor and outdoor environments. It may also be developed for professional use. In this case, it could, for example, as illustrated on FIGS. 6 to 8, be built into a work top 50 or a cooking range. As illustrated on FIG. 8, the cooking appliance 1a could be fitted with a cover 62 forming a work surface 63 and designed to cover said cooking appliance when not in use, in order to optimize the surface that said cooking appliance takes up on said work top 50. It could also be equipped with an additional heating surface 3 and comprise on one side at least one infrared radiation tube 7 to grill the foodstuffs and on its opposite side at least one induction coil 60 to cook foodstuffs when the heating surface 3 is placed in its passive position and the infrared radiation emitter 7 is located in the housing 4.

This invention is not limited to the embodiments described, but extends to any modification and variant obvious to those skilled in the art while remaining within the scope of the protection defined in the attached claims.

The invention claimed is:

1. A cooking appliance of the grill or barbecue type, comprising a frame supporting a cooking surface, on which foodstuffs to be cooked can be arranged, and a heating surface arranged opposite said cooking surface, said frame comprising first means designed to allow inclination of said cooking surface with respect to a horizontal plane at an angle α less than 90°, and second means designed to allow inclination of said heating surface with respect to said horizontal plane at an angle β less than 90°, said cooking surface being arranged below said heating surface so that the substances released by the foodstuffs while they cook do not run onto said heating surface, wherein said frame defines a housing whose bottom forms said horizontal plane and designed to accommodate said cooking surface between a storage position in which it lies on the bottom of the housing and a use position in which it is inclined at said angle α to said horizontal plane, and in that said second means comprise a hinge connecting said heating surface to said frame and allowing the displacement of said heating surface between a passive position in which it closes said housing and an active position in which it is inclined at said angle β to said horizontal plane, said housing is open and said cooking surface may be deployed and positioned opposite said heating surface, wherein said heating surface comprises on one of its sides at least one first heat generator defined by an infrared radiation tube and on the other side thereof at least one second heat generator different from said first heat generator to create two different types of cooking.

2. The cooking appliance according to claim 1, wherein said first means comprise at least one notch formed in said housing and designed to accommodate at least a portion of an edge of said cooking surface, an axis of said notch being inclined at said angle α to said horizontal plane.

3. The cooking appliance according to claim 2, wherein said first means comprise a plurality of notches whose axes are inclined at said angle α to said horizontal plane planned on a rack fastened to said housing and allowing adjustment of the distance between said cooking surface and said heating surface in its use position.

4. The cooking appliance according to claim 1, wherein said housing comprises a removable bottom to catch the substances released from the foodstuffs while they cook.

5. The cooking appliance according to claim 1, wherein said second means designed to allow inclination at an angle β less than 90° of said heating surface to said horizontal plane comprise means for locking in position.

6. The cooking appliance according to claim 1, wherein said cooking surface is removable and reversible so that each side can be directed successively towards said heating surface.

7. The cooking appliance according to claim 6, wherein said cooking surface comprises a cooking grill formed from self-tightening sides defining between them at least one space where the foodstuffs to be cooked can be placed.

8. The cooking appliance according to claim 7, wherein said space comprises compartments of various sizes in order to accommodate different types of foodstuff.

9. The cooking appliance according to claim 1, wherein said heating surface comprises at least one infrared radiation tube connected to a power source selected from gas, electricity or a flammable fluid.

10. The cooking appliance according to claim 9, wherein said infrared radiation tube is arranged between a metal side designed to reflect the heat that said infrared radiation tube diffuses towards the cooking surface and a glazed side arranged opposite the cooking surface, permeable to the infrared radiation and designed to protect said infrared radiation tube from any accidental mechanical contact with the foodstuffs or possible splashes of substances released from the foodstuffs while they cook.

11. The cooking appliance according to claim 10, wherein said infrared radiation tube is connected to means for regulating power in order to adjust the heat diffused to said foodstuffs.

12. The cooking appliance according to claim 9, wherein the cooking appliance further comprises a connector designed to connect said at least one infrared radiation tube to a power source and arranged on a side of said heating surface such that said connector is only accessible when said heating surface is in the active position.

13. The cooking appliance according to claim 1, wherein said second heat generator comprises at least one induction coil.

14. The cooking appliance according to claim 1, wherein said frame comprises means designed to allow its integration in a work top.

15. The cooking appliance according to claim 14, wherein the cooking appliance further comprises a cover forming a work surface and designed to cover said cooking appliance when said cooking appliance is not in use.

* * * * *